United States Patent
Hill et al.

[19]

[11] Patent Number: 5,905,945
[45] Date of Patent: May 18, 1999

[54] METHOD AND APPARATUS FOR IMPROVING THE RELIABILITY OF COMMUNICATING A MESSAGE FROM A PORTABLE SUBSCRIBER UNIT TO A BASE RECEIVER IN A TWO-WAY RADIO MESSAGING SYSTEM

[75] Inventors: Thomas Casey Hill, Trophy Club; Slim Souissi, Fort Worth, both of Tex.; Thomas V. D'Amico, Boca Raton; Robert J. Schwendeman, Pompano Beach, both of Fla.

[73] Assignee: Motorola, Inc., Schaumburg, Ill.

[21] Appl. No.: 08/846,766

[22] Filed: Apr. 30, 1997

[51] Int. Cl.$^6$ ................................................. H04Q 7/00
[52] U.S. Cl. .................... 455/31.3; 455/67.1; 455/504; 455/63
[58] Field of Search .................. 455/504, 67.3, 455/31.3, 506, 67.7, 226.4, 67.1, 68, 63, 432, 441, 38.1, 501, 134, 135, 226.2, 277.2, 10

[56] References Cited

U.S. PATENT DOCUMENTS

| | | | |
|---|---|---|---|
| 4,556,760 | 12/1985 | Goldman | 455/436 |
| 4,825,193 | 4/1989 | Siwiak et al. | 340/311.1 |
| 4,893,349 | 1/1990 | Eastmond et al. | 455/205 |
| 5,444,438 | 8/1995 | Goldberg | 455/38.1 |
| 5,457,732 | 10/1995 | Goldberg | 379/201 |
| 5,546,411 | 8/1996 | Leitch et al. | 455/67.3 |
| 5,606,729 | 2/1997 | D'Amico et al. | 455/67.1 |
| 5,634,206 | 5/1997 | Reed et al. | 455/504 |
| 5,745,532 | 4/1998 | Campana, Jr. | 455/504 |
| 5,826,172 | 10/1998 | Ito et al. | 455/38.3 |

*Primary Examiner*—Curtis A. Kuntz
*Assistant Examiner*—Binh K. Tieu
*Attorney, Agent, or Firm*—R. Louis Breeden

[57] ABSTRACT

A portable subscriber unit (104) monitors (602) a signal fading rate in an outbound channel from a base station (102), and transmits a message. The portable subscriber unit transmits (606) the message once on an inbound channel in response to the signal fading rate in the outbound channel being less than a predetermined value. The portable subscriber unit transmits (608) the message more than once in response to the signal fading rate in the outbound channel being greater than or equal to the predetermined value.

21 Claims, 4 Drawing Sheets

METHOD AND APPARATUS FOR IMPROVING THE RELIABILITY OF COMMUNICATING A MESSAGE FROM A PORTABLE SUBSCRIBER UNIT TO A BASE RECEIVER IN A TWO-WAY RADIO MESSAGING SYSTEM

FIELD OF THE INVENTION

This invention relates in general to radio communication systems, and more specifically to a method and apparatus for improving the reliability of communicating a message from a portable subscriber unit to a base receiver on an inbound channel of a two-way radio messaging system.

BACKGROUND OF THE INVENTION

Two-way radio messaging systems, also known as acknowledge-back paging systems, utilize low-power transmitters in the portable subscriber units to transmit messages and acknowledgments to the base receivers of the system using an inbound channel. When a portable subscriber unit is being transported in a rapidly moving vehicle, multipath fading decreases the reliability of the inbound and outbound channel transmissions. Fading can be particularly problematic for the inbound channel, which typically utilizes messages that are too short to benefit much from well-known reliability enhancing techniques such as code interleaving.

In an exemplary two-way messaging system utilizing a 4800 bit per second inbound transmission rate, approximately 19 dB higher signal margin was determined to be required for a subscriber unit moving at 45 miles (73 kilometers) per hour, as compared to a motionless subscriber unit, to achieve a packet error rate of 1 percent. A system designed with a gain margin 19 dB higher than required for static reception would not be economically feasible. One possible solution would be to repeat all inbound messages. That solution, however, would adversely impact inbound channel throughput.

Thus, what is needed is a method and apparatus that can improve the reliability of the inbound channel transmissions. Preferably the method and apparatus will generate a minimum impact on the throughput of the inbound channel.

SUMMARY OF THE INVENTION

An aspect of the present invention is a method for improving a reliability of communicating a message from a portable subscriber unit to a base receiver on an inbound channel of a two-way radio messaging system. The method comprises the steps of monitoring by the portable subscriber unit a signal fading rate in an outbound channel from a base transmitter, and transmitting the message once by the portable subscriber unit in response to the signal fading rate being less than a predetermined value. The method further comprises the step of sending the message more than once by the portable subscriber unit in response to the signal fading rate being greater than or equal to the predetermined value.

Another aspect of the present invention is a portable subscriber unit having an improved reliability of communicating a message to a base receiver on an inbound channel of a two-way radio messaging system. The portable subscriber unit comprises a processor for controlling the portable subscriber unit, and a clock coupled to the processor for generating a timing signal. The portable subscriber unit further comprises a receiver coupled to the processor for monitoring a signal fading rate in an outbound channel from a base transmitter, and a transmitter coupled to the processor for transmitting the message. The processor is programmed to control the transmitter to transmit the message once in response to the signal fading rate being less than a predetermined value, and to send the message more than once in response to the signal fading rate being greater than or equal to the predetermined value.

Another aspect of the present invention is a base station having an improved reliability of receiving a message from a portable subscriber unit on an inbound channel of a two-way radio messaging system. The base station comprises a base receiver for receiving the inbound channel, and a processor coupled to the receiver for cooperating with the base receiver to monitor noise in the inbound channel. The base station further comprises a transmitter coupled to the processor for transmitting messages and commands to the portable subscriber unit on an outbound channel. The processor is programmed to control the transmitter to transmit a command commanding the portable subscriber unit to send inbound messages more than once in response to the noise in the inbound channel being greater than a predetermined value.

DETAILED DESCRIPTION OF THE DRAWINGS

Figure 1:
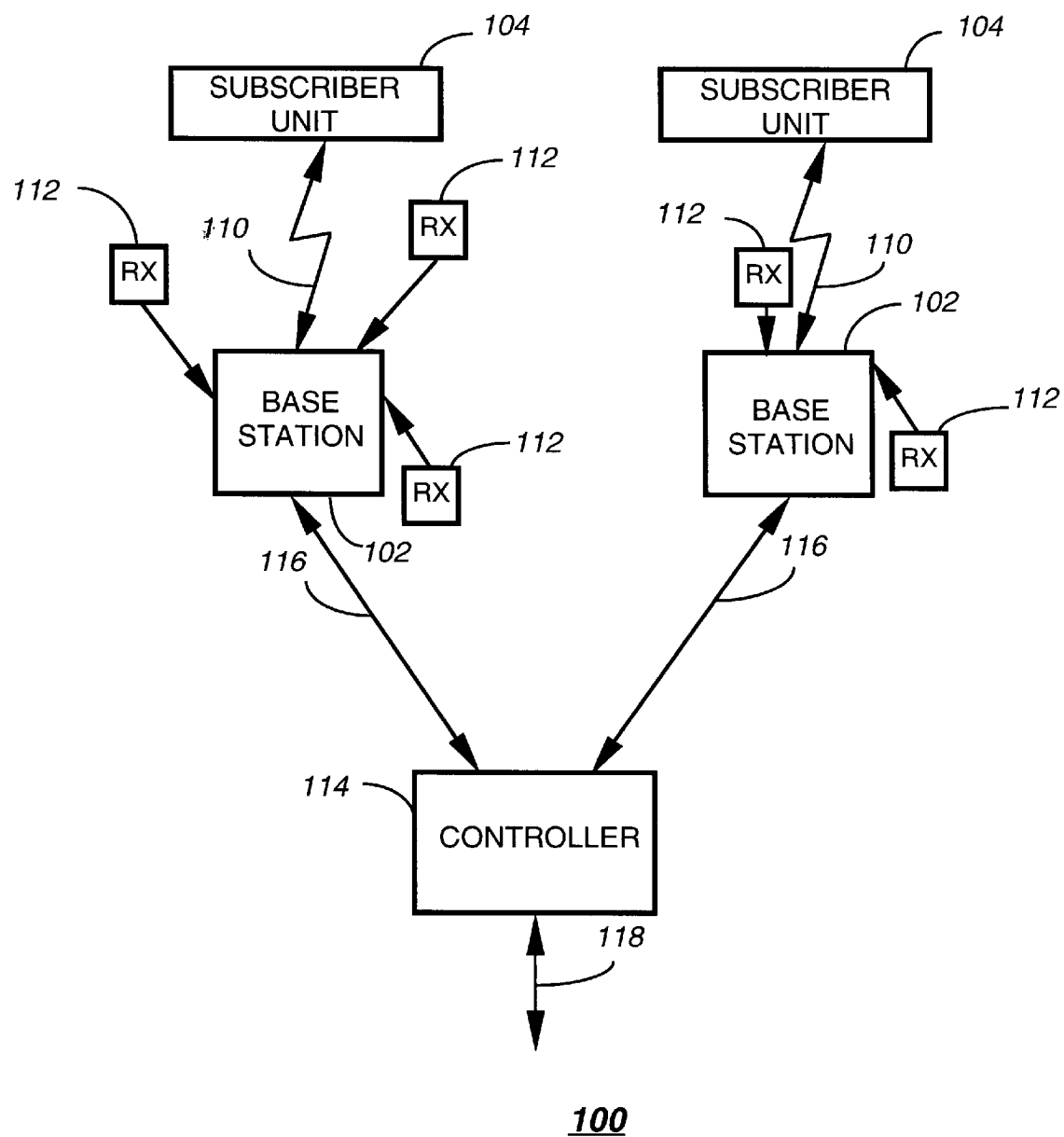
FIG. 1 is an electrical block diagram of a two-way radio messaging system in accordance with the present invention.

Referring to FIG. 1, an electrical block diagram depicts a two-way radio messaging system 100 in accordance with the present invention. The messaging system 100 comprises a plurality of base stations 102 coupled by radio paths 110 to a plurality of portable subscriber units 104. The portable subscriber units 104 are preferably two-way messaging units, which can generate inbound responses to the base stations 102. The messaging system 100 further comprises a plurality of conventional base receivers 112 for receiving radio signals comprising messages from the portable subscriber units. The base stations 102 are coupled by communication links 116 to a conventional controller 114 for controlling the base stations 102 using techniques well known in the art. The controller 114 is coupled through an additional communication link 118 to an input entity (not shown) for generating message originations using well-known techniques. The input entity can be, for example, a telephone set, a video display terminal, another controller, or a network interconnecting any or all of the above input entities. The signals over the radio paths 110 preferably utilize a well-known messaging protocol, such as a member of Motorola's FLEX™ family of protocols. These protocols comprise error detection and correction mechanisms, which give the protocols the necessary robustness for use in radio messaging systems. It will be appreciated that, alternatively, other suitable protocols can be utilized as well over the radio paths 110. The controller 114 is preferably similar to the RF-Conductor!™ message distributor, manufactured by Motorola, Inc. It will be appreciated that, alternatively, other similar equipment can be utilized as well for the controller 114.

Figure 2:
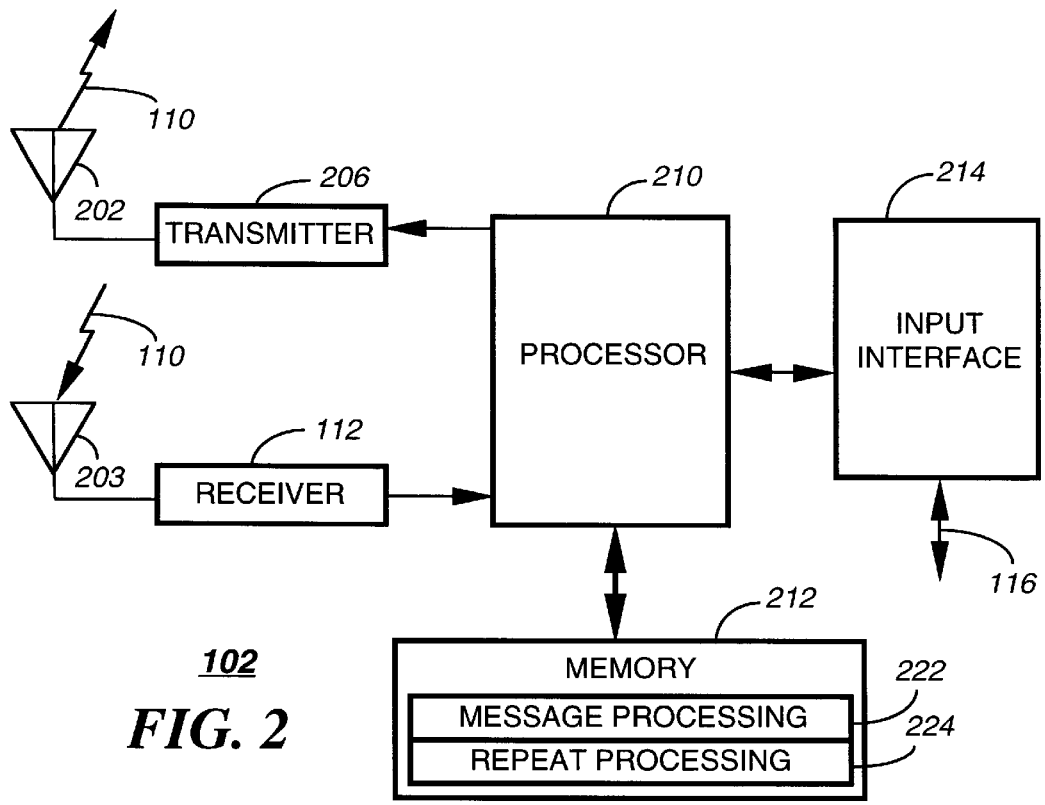
FIG. 2 is an electrical block diagram of a base station in accordance with the present invention.

Referring to FIG. 2, an electrical block diagram depicts the base station 102 in accordance with the present invention, comprising an antenna 203 for intercepting inbound messages from the portable subscriber units 104. The antenna 203 is coupled to the base receiver 112 for receiving the inbound messages. Preferably, the base receiver 112 comprises a conventional received signal strength indicator (RSSI) (not shown) for determining and reporting the signal power received over the inbound channel, using well-known techniques. The base receiver 112 is coupled to a processor 210 for processing the inbound messages. A memory 212 is coupled to the processor 210 for programming the processor 210 to process the inbound and outbound messages and to determine when repeat messages are needed from a portable subscriber unit on the inbound channel in accordance with the present invention. An input interface 214 is also coupled to the processor 210 for communicating with the controller 114 over the communication link 116. The processor 210 is also coupled to a base transmitter 206 for transmitting outbound information to the portable subscriber unit 104, the outbound information including repeat commands. The base transmitter 206 is coupled to an antenna 202 for emitting the outbound information as a radio signal. It will be appreciated that, alternatively, the two antennas 202, 203 can be replaced with a single antenna used for both transmitting and receiving. In this case, a switch or other means can be used to isolate the base receiver 112 and the base transmitter 206. It will be further appreciated that the base receiver 112, and additional base receivers 112, can be positioned at locations remote from the base station 102. It also will be appreciated that the memory 212 can be incorporated as an integral portion of the processor 210.

For processing the inbound and outbound messages, the memory 212 includes a message processing element 222. In addition, the memory includes a repeat processing element 224 in accordance with the present invention. The repeat processing element 224 programs the processor 210 to cooperate with the base receiver 112 to monitor the noise in the inbound channel, and to control the base transmitter 206 to transmit a repeat command commanding the portable subscriber unit 104 to send inbound messages more than once in response to the noise in the inbound channel being greater than a predetermined value. This can be accomplished, for example, by measuring the signal power received by the base receiver 112 during a time when the portable subscriber units 104 of the radio messaging system are not transmitting, using well-known techniques. When this received signal power is greater than a predetermined amount, e.g., 3 dB, above the thermal noise power generated internal to the base receiver 112, then inbound message repeating is activated. The base transmitter 206 is preferably similar to the Nucleus® Orchestra! transmitter manufactured by Motorola, Inc. The base receiver 112 is preferably similar to the RF-Audience!™ inbound base receiver also manufactured by Motorola, Inc. It will be appreciated that other similar equipment can be utilized for the base transmitter 206 and the base receiver 112.

Figure 3:
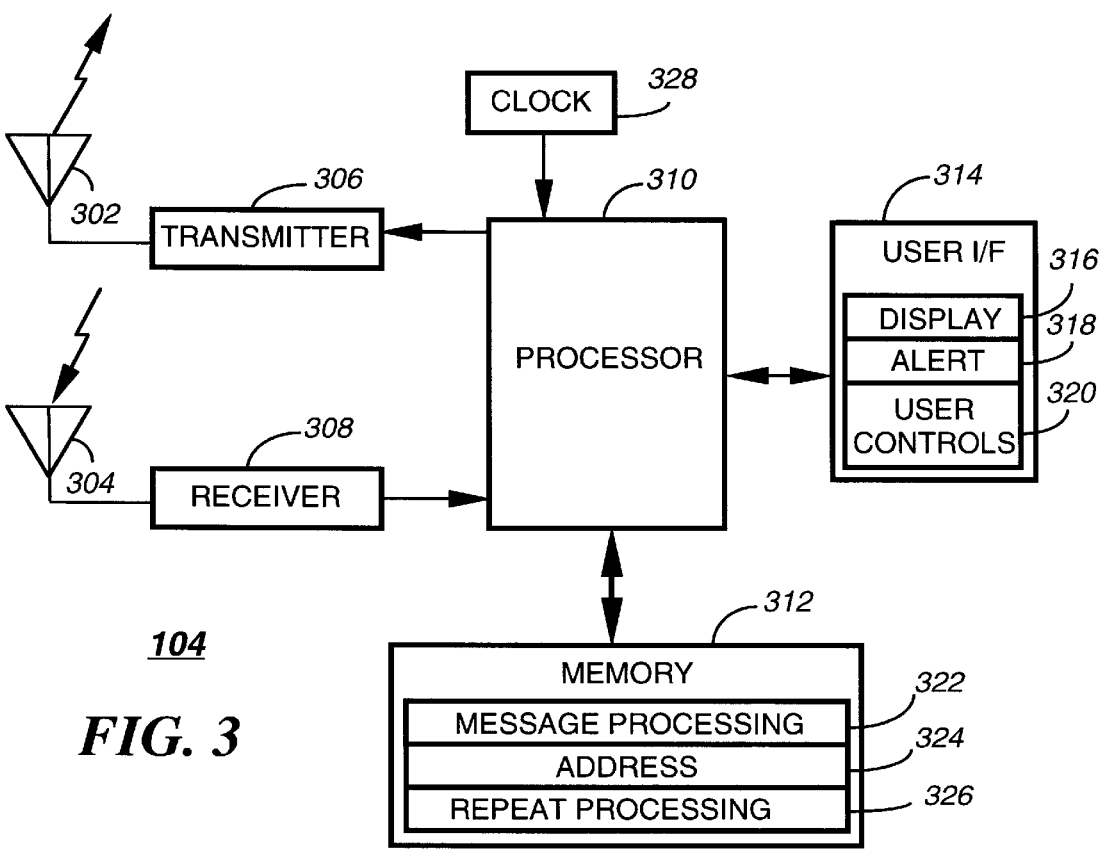
FIG. 3 is an electrical block diagram of a portable subscriber unit in accordance with the present invention.

Referring to FIG. 3, an electrical block diagram depicts the subscriber unit 104 in accordance with the present invention, comprising an antenna 304 for intercepting transmissions from the base stations 102 over the outbound channel. The antenna 304 is coupled to a conventional receiver 308 for receiving the transmissions to derive information therefrom. Preferably, the receiver 308 comprises a conventional RSSI (not shown) for determining and reporting the signal power received over the outbound channel, using well-known techniques. The receiver 308 is coupled to a conventional processor 310 for processing the received information, including a repeat command for controlling inbound message repeats, as is discussed further herein below. A conventional clock 328 is coupled to the processor 310 for providing a timing signal thereto for timing a predetermined measurement period during which the signal fades are counted, as described further below. The processor 310 is coupled to a user interface 314 for conveying portions of the received information to a user, via, for example, a conventional display 316. The user interface 314 also includes a conventional alert 318 for alerting the user that new information has arrived. In addition, the user interface includes conventional user controls 320 for controlling the subscriber unit 104. The processor 310 is further coupled to a conventional transmitter 306 for communicating a transmission data packet to the base receivers 112 through the inbound channel. The transmitter 306 is coupled to an antenna 302 for emitting a radio signal comprising the transmission data packet. It will be appreciated that, alternatively, the two antennas 302, 304 can be replaced with a single antenna used for both transmitting and receiving. In this case, a switch or other means can be used to isolate the receiver 308 and the transmitter 306.

The processor 310 is further coupled to a conventional memory 312 for storing software and variables for programming the processor 310 in accordance with the present invention. It will be appreciated that, alternatively, the clock 328 and the memory 312, or both, can be incorporated as an integral portion of the processor 310. The memory 312 comprises a message processing element 322 for processing received messages using well-known techniques. The memory 312 further comprises a selective call address 324 for identifying the subscriber unit 104. In addition, the memory 312 includes a repeat processing element 326 for programming the processor 310 to control the number of times an, inbound message is repeated in accordance with the present invention. The repeat processing element 326 programs the processor 310 to cooperate with the receiver 308 to monitor a signal fading rate in the outbound channel from the base transmitter 206. The repeat processing element 326 further programs the processor 310 to control the transmitter 306 to transmit the inbound message once in response to the signal fading rate being less than a predetermined value, and to send the message more than once in response to the signal fading rate being greater than or equal to the predetermined value. Preferably, the repeat processing element 326 further programs the processor 310 to send each repeat of the message at a time such that adequate time diversity is likely to be achieved in a slow, e.g., 5 mile (8 km) per hour, fading environment. For example, the message and the repeat(s) preferably are separated in time by at least 0.3 seconds.

Also preferably, the repeat processing element 326 further programs the processor 310 to control the transmitter 306 to transmit the inbound message (once) at a first transmission rate, e.g., 4800 bps, in response to the signal fading rate being less than the predetermined value, e.g., 8 fades per second, and to send the inbound message, e.g., twice, at a second transmission rate, e.g., 9600 bps, in response to the signal fading rate being greater than or equal to the predetermined value, the second transmission rate being greater than the first transmission rate. In this manner, throughput can be advantageously maintained. It will be appreciated that, alternatively, many other combinations of transmission rates, repeats, and separation times can be utilized in accordance with the present invention. It will be further appreciated that, alternatively, more repeats can be utilized. For example, if the system traffic is low, the controller 114 can send a command to the portable subscriber units 104 to send inbound messages three or even four times when repeats are determined to be needed. Another way of controlling the number of repeats is to set the number based upon time of day, preferably along with day of week. It is well known that traffic levels in a radio messaging system have a high correlation with time of day and day of week. Time of day and day of week preferably are transmitted in a designated block information word of the outbound protocol (as is done in the ReFLEX™ protocol, for example), so that they are readily available throughout the radio messaging system.

Preferably, the repeat processing element 326 programs the processor 310 to cooperate with the receiver 308 to count occurrences of the received signal strength falling and remaining below a predetermined level, e.g., a level 10 dB below the average received signal power, for at least a predetermined duration, e.g., 1 msec., during a predetermined measurement period, e.g., 2 seconds. Alternatively, the repeat processing element 326 can program the processor 310 to cooperate with the receiver 308 to count occurrences of the received signal strength changing from above a first predetermined level, e.g., a level 8 dB below the average received signal power, to below a second predetermined level, e.g., a level 12 dB below the average received signal power, and then returning to above the first predetermined level during the predetermined measurement period. As a further alternative, the repeat processing element 326 can program the processor 310 to cooperate with the receiver 308 to simply count occurrences of the received signal strength falling below a predetermined level during the predetermined measurement period. An additional alternative embodiment applies to systems which utilize a pilot carrier signal in the outbound channel. In such systems the repeat processing element 326 can program the processor 310 to cooperate with the receiver 308 to monitor the signal fading rate of the pilot carrier, using techniques similar to those described herein above for monitoring the received signal strength. It will be appreciated that many other alternative combinations of levels, durations, and measurement periods can be used in accordance with the present invention. The repeat processing element 326 also programs the processor 310 to send inbound messages more than once in response to a repeat command received over the outbound channel from the base station 102.

Figure 4:
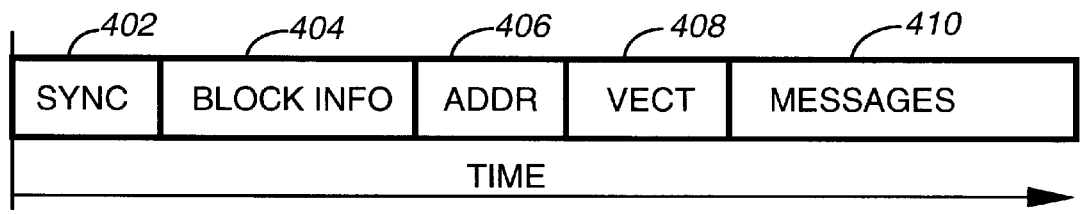
FIG. 4 is an outbound protocol diagram in accordance with the present invention.

FIG. 4 is an outbound protocol diagram depicting a data block 400 in accordance with the present invention. The data block 400 comprises a sync portion 402 for use in synchronizing the portable subscriber units 104 with transmissions of the base stations 102 using techniques well known in the art. The data block 400 further comprises a block information word (BIW) 404, which provides system configuration information to the subscriber units 104. The data block 400 also includes selective call addresses 406 of selected subscriber units 104 for which the remainder of the data block is intended. The addresses 406 point to vectors 408, which in turn point to messages 410, using well known techniques. In one embodiment in accordance with the present invention, the vectors 408 carry commands for controlling the number of times the inbound messages from a subscriber unit 104 are to be repeated. This is preferably accomplished by utilizing a few, e.g., 1 to 3, bit positions in an existing vector structure of the protocol, the bit positions currently unused. Alternatively, a new vector type, currently reserved in the protocol, can be activated for controlling the number of inbound repeats.

Figure 5:
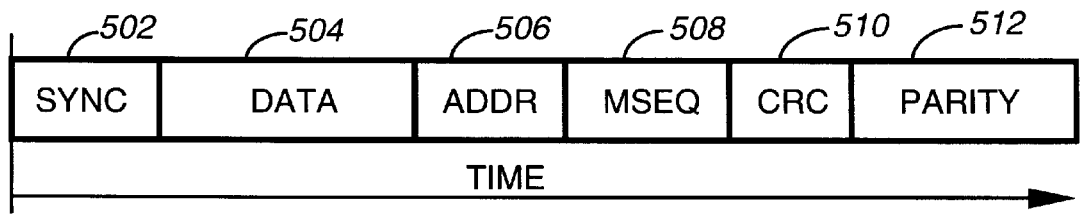
FIG. 5 is an inbound protocol diagram in accordance with the present invention.

FIG. 5 is an inbound protocol diagram depicting an inbound data stream 500 used for sending an inbound message in accordance with the present invention. The inbound data stream 500 preferably consists of a single data packet. The inbound data stream 500 comprises a sync field 502 for use in synchronizing the base receivers 112 of the base stations 102 with transmissions of the portable subscriber unit 104 using techniques well known in the art. The data stream 500 further comprises a data field 504 for conveying information, e.g., a message, to the base stations 102, and an address field 506 for providing the address of the portable subscriber unit 104 sending the information. The data stream 500 also includes a message sequence field 508 for helping keep track of the order of the messages, using well-known techniques. In addition, the data stream 500 includes an error checking mechanism comprising a cyclic redundancy check (CRC) field 510 and a parity field 512. The error checking mechanism 510, 512 operates in a well-known manner to detect and correct transmission errors provided the errors are not too numerous in any one data stream 500. It will be appreciated that, alternatively, the inbound data stream 500 can include a plurality of data packets. The data stream 500 is preferably sent more than once (with time diversity) for each inbound message whenever inbound message repeating is activated in accordance with the present invention.

Figure 6:
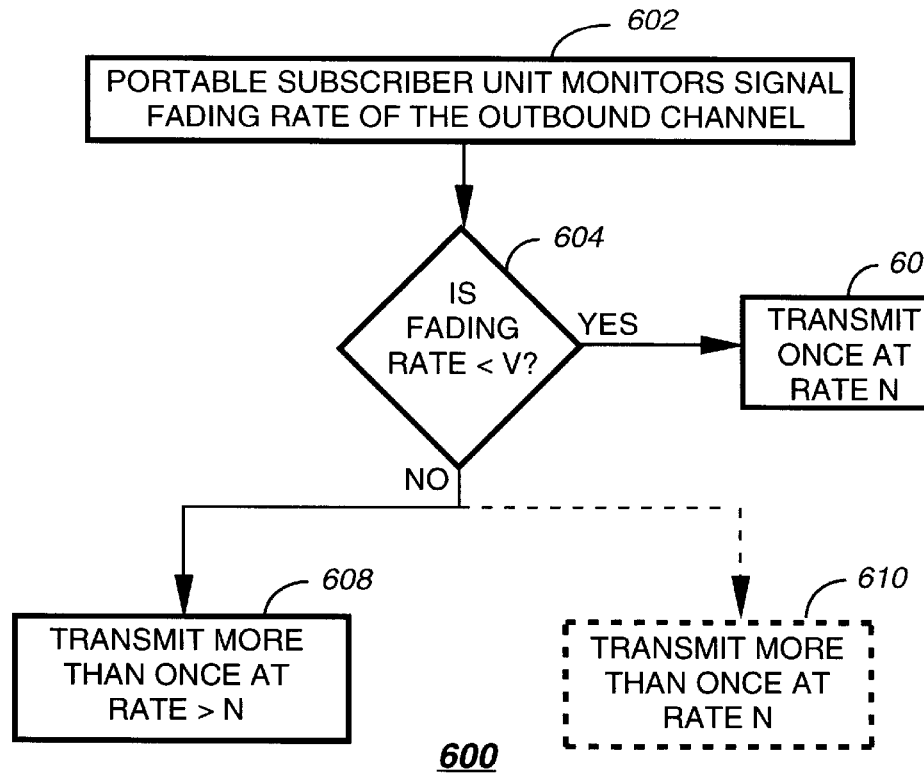
FIG. 6 is a flow diagram depicting operation of the portable subscriber unit in accordance with the present invention.

FIG. 6 is a flow diagram 600 depicting operation of the portable subscriber unit 104 in accordance with the present invention. The flow begins when the portable subscriber unit 104 monitors 602 the signal fading rate of the outbound channel using the well-known techniques described herein above. The processor 310 can monitor, for example, a Where aRe yoU (WRU) command sent before delivery of a message, along with other transmissions received over the outbound channel. The processor 310 then checks 604 whether the signal fading rate, i.e., the number of signal fades counted over a measurement period, is less than a predetermined value V. If so, an inbound message which the portable subscriber unit 104 has ready to transmit is transmitted 606 once using a "normal" transmission speed N bps, e.g., 4800 bps. If, on the other hand the signal fading rate is not less than the predetermined value V, then an inbound message which the portable subscriber unit 104 has ready to transmit preferably is transmitted 608 more than once, e.g., twice, at a transmission speed greater than the normal transmission speed N bps, e.g., 2N bps. In this manner, throughput is advantageously maintained. Preferably, each repeat of the message is sent at a time such that adequate time diversity is likely to be achieved in a slow fading environment. For example, the message and the repeat(s) can be separated in time by at least 0.3 seconds. It will be appreciated that, alternatively, the inbound message can be transmitted 610 more than once using the same transmission speed (N bps).

Figure 7:
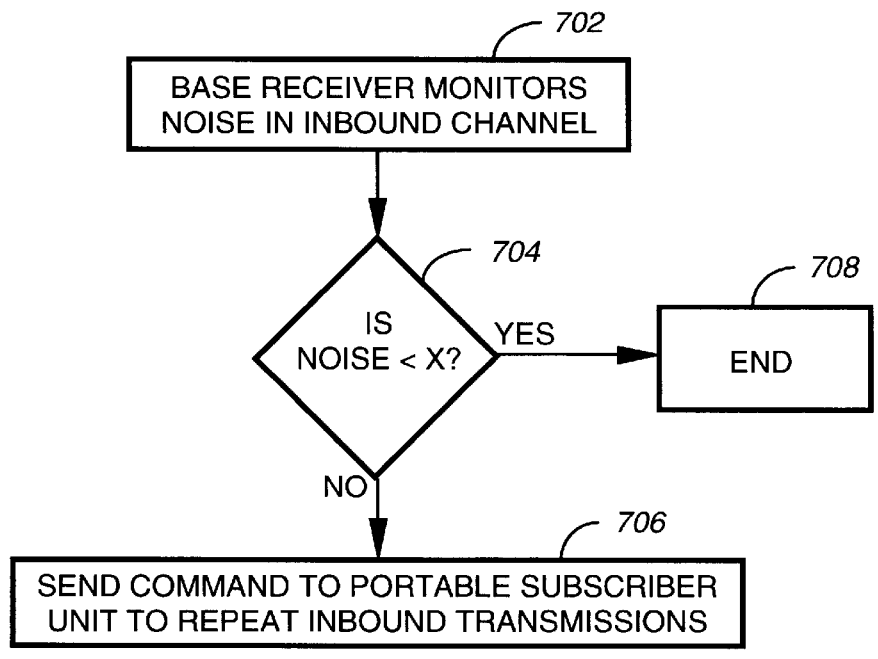
FIG. 7 is a flow diagram depicting operation of the base station in accordance with the present invention.

FIG. 7 is a flow diagram 700 depicting operation of the base station 102 in accordance with the present invention. The flow begins when the base receiver 112 monitors 702 noise in the inbound channel. This is preferably accomplished through well-known noise measurement techniques applied during periods when the portable subscriber units 104 are not generating inbound channel transmissions. The processor 210 of the base station 102 checks 704 whether the noise is less than a predetermined amount X. If so, the process ends 708. If not, the processor 210 controls the base transmitter 206 to transmit 706 a command commanding the portable subscriber unit 104 to send inbound messages more than once, e.g., twice.

Thus, it should be clear from the foregoing disclosure that the present invention provides a method and apparatus that improve the reliability of the inbound channel transmissions. Advantageously, the method and apparatus offer provisions for generating a minimum impact on the throughput of the inbound channel.

While the foregoing has disclosed by way of example several embodiments in accordance with the present invention, it will be appreciated that many alternative embodiments in accordance with the present invention may occur to one of ordinary skill in the art, given the teachings of this disclosure. Consequently, the scope of the invention is delimited only according to the following claims.

What is claimed is:

1. A method for improving a reliability of communicating a message from a portable subscriber unit to a base receiver on an inbound channel of a two-way radio messaging system, comprising the steps of:

monitoring by the portable subscriber unit a signal fading rate in an outbound channel from a base transmitter;

transmitting the message once by the portable subscriber unit in response to the signal fading rate being less than a predetermined value; and sending the message more than once by the portable subscriber unit in response to the signal fading rate being greater than or equal to the predetermined value.

2. The method of claim 1, wherein the sending step comprises the step of sending each repeat of the message at a time such that adequate time diversity is likely to be achieved in a slow fading environment.

3. The method of claim 1, wherein the transmitting step is performed at a first transmission rate, and wherein the sending step is performed at a second transmission rate, the second transmission rate being greater than the first transmission rate.

4. The method of claim 1, wherein the monitoring step comprises the step of counting occurrences of received signal strength falling below a predetermined level during a predetermined measurement period.

5. The method of claim 1, wherein the monitoring step comprises the step of counting occurrences of received signal strength falling and remaining below a predetermined level for at least a predetermined duration during a predetermined measurement period.

6. The method of claim 1, wherein the monitoring step comprises the step of counting occurrences of received signal strength changing from above a first predetermined level to below a second predetermined level and then returning to above the first predetermined level during a predetermined measurement period.

7. The method of claim 1,
wherein the outbound channel comprises a pilot carrier, and
wherein the monitoring step comprises the step of monitoring the signal fading rate of the pilot carrier.

8. The method of claim 1, further comprising the steps of:
monitoring, by a base station, noise present in the inbound channel; and
commanding the portable subscriber unit to send inbound messages more than once in response to the noise being greater than a predetermined amount.

9. The method of claim 1, wherein the sending step comprises the step of sending the message a number of times, the number determined by how much traffic is currently being handled by the two-way radio messaging system.

10. The method of claim 1, wherein the sending step comprises the step of sending the message a number of times, the number determined by at least one of (a) time of day and (b) day of week.

11. A portable subscriber unit having an improved reliability of communicating a message to a base receiver on an inbound channel of a two-way radio messaging system, the portable subscriber unit comprising:

a processor for controlling the portable subscriber unit;

a clock coupled to the processor for generating a timing signal;

a receiver coupled to the processor for monitoring a signal fading rate in an outbound channel from a base transmitter; and a transmitter coupled to the processor for transmitting the message, wherein the processor is programmed to control the transmitter to transmit the message once in response to the signal fading rate being less than a predetermined value, and to send the message more than once in response to the signal fading rate being greater than or equal to the predetermined value.

12. The portable subscriber unit of claim 11, wherein the processor is further programmed to send each repeat of the message at a time such that adequate time diversity is likely to be achieved in a slow fading environment.

13. The portable subscriber unit of claim 11, wherein the processor is further programmed to transmit the message at a first transmission rate in response to the signal fading rate being less than the predetermined value, and to send the message at a second transmission rate in response to the signal fading rate being greater than or equal to the predetermined value, the second transmission rate being greater than the first transmission rate.

14. The portable subscriber unit of claim 11, wherein the receiver and the processor are arranged and programmed to count occurrences of received signal strength falling below a predetermined level during a predetermined measurement period.

15. The portable subscriber unit of claim 11, wherein the receiver and the processor are arranged and programmed to count occurrences of received signal strength falling and remaining below a predetermined level for at least a predetermined duration during a predetermined measurement period.

16. The portable subscriber unit of claim 11, wherein the receiver and the processor are arranged and programmed to count occurrences of received signal strength changing from above a first predetermined level to below a second predetermined level and then returning to above the first predetermined level during a predetermined measurement period.

17. The portable subscriber unit of claim 11,
wherein the outbound channel comprises a pilot carrier, and
wherein the receiver and the processor are arranged and programmed to monitor the signal fading rate of the pilot carrier.

18. The portable subscriber unit of claim 11, wherein the processor is programmed to send inbound messages more than once in response to a command received over the outbound channel.

19. The portable subscriber unit of claim 11, wherein the processor is programmed to send the message a number of times in response to the signal fading rate being greater than or equal to the predetermined value, the number determined by a command from a controller of the radio messaging system, the command responsive to how much traffic is currently being handled by the two-way radio messaging system.

20. The portable subscriber unit of claim 11, wherein the processor is programmed to send the message a number of times in response to the signal fading rate being greater than or equal to the predetermined value, the number determined by at least one of (a) time of day and (b) day of week.

21. A base station having an improved reliability of receiving a message from a portable subscriber unit on an inbound channel of a two-way radio messaging system, the base station comprising:

a base receiver for receiving the inbound channel;

a processor coupled to the base receiver for cooperating with the base receiver to monitor noise in the inbound channel; and a transmitter coupled to the processor for transmitting messages and commands to the portable subscriber unit on an outbound channel, wherein the processor is programmed to control the transmitter to transmit a command commanding the portable subscriber unit to send inbound messages more than once in response to the noise in the inbound channel being greater than a predetermined value.

* * * * *